United States Patent [19]

Müller et al.

[11] 4,365,000
[45] Dec. 21, 1982

[54] MOLDED BODIES OF VULCANIZED RUBBER HAVING A VULCANIZED-ON LAYER OF VARNISH

[75] Inventors: Hanns P. Müller, Odenthal; Kuno Wagner, Leverkusen; Johannes Blahak, Gauting-Buchendorf; Hermann Menk, Bodolz, all of Fed. Rep. of Germany

[73] Assignee: Metzeler Kautschuk GmbH, Munich, Fed. Rep. of Germany

[21] Appl. No.: 134,884

[22] Filed: Mar. 28, 1980

[30] Foreign Application Priority Data

Apr. 21, 1979 [DE] Fed. Rep. of Germany ....... 2916271

[51] Int. Cl. ............................................. B32B 27/40
[52] U.S. Cl. .............................. 428/423.9; 156/331.1; 156/333; 156/331.4; 427/393.5; 428/424.8
[58] Field of Search ......................... 427/393.5, 385.5; 156/331, 333, 331.1, 331.9; 428/423.9, 423.1, 492, 424.8

[56] References Cited

U.S. PATENT DOCUMENTS

| | | | |
|---|---|---|---|
| 3,873,348 | 3/1975 | Reilly et al. ....................... | 427/393.5 |
| 3,887,756 | 7/1975 | Gerstin ............................. | 428/424.8 |
| 3,919,351 | 11/1975 | Chang et al. ..................... | 428/424.8 |
| 3,989,609 | 11/1976 | Brack ................................ | 428/424.8 |
| 3,991,255 | 11/1976 | Blaskiewicz ..................... | 427/393.5 |
| 4,013,806 | 3/1977 | Volkert et al. ................... | 427/393.5 |
| 4,024,317 | 5/1977 | Stoye et al. ...................... | 428/424.8 |
| 4,143,091 | 3/1979 | Chang et al. ..................... | 428/424.8 |
| 4,205,102 | 5/1980 | Schuurink et al. .............. | 427/393.5 |
| 4,240,852 | 12/1980 | Gomberg et al. ................ | 428/424.8 |
| 4,265,973 | 5/1981 | Schuurink et al. .............. | 428/424.8 |

*Primary Examiner*—George F. Lesmes
*Assistant Examiner*—E. Rollins Buffalow
*Attorney, Agent, or Firm*—Herbert L. Lerner; Laurence A. Greenberg

[57] ABSTRACT

Molded body of vulcanized rubber having firmly adhering varnish layer produced by applying a coating of varnish which has a compound with a member which will on subsequent vulcanization participate in the vulcanization reaction, to the surface of the unvulcanized molded body. Subsequently vulcanizing the coated molded body to cause the member to participate in the vulcanization and produce a vulcanized rubber molded body with a firmly adhering varnish layer.

5 Claims, No Drawings

MOLDED BODIES OF VULCANIZED RUBBER HAVING A VULCANIZED-ON LAYER OF VARNISH

BACKGROUND OF THE INVENTION

1. Field of the Invention

The present invention relates to molded bodies of vulcanized rubber and more particularly refers to a new and improved method of manufacturing a molded body of vulcanized rubber with a firmly adhering layer of varnish, and to the vulcanized varnish coated molded body produced thereby.

2. Description of the Prior Art

Varnishing rubber presents considerable practical difficulties because the surface of the substrate to be varnished is usually apolar and the adhesion due to this is poor. Thus, there have been attempts to overcome these adhesion problems by a pretreatment of the surface to be varnished, for instance, by means of an oxidant or through the use of UV-irradiation (Netherlands Published Non-Prosecuted Application No. 7506793). According to German Published Non-Prosecuted Application No. 28 23 350, an attempt was made to overcome the adhesion problems by using special polyurethane varnishes. Also with the method according to this publication, the varnish is applied after the vulcanizing, so that the method according to this publication did not and could not solve the adhesion problems.

SUMMARY OF THE INVENTION

It is an object of the present invention to provide a method for manufacture of molded rubber parts which are provided with a firmly adhering varnish layer, i.e. a varnish layer which forms a unit with the molded part.

With the foregoing and other objects in view, there is provided in accordance with the invention a method for manufacturing a molded body of vulcanized rubber having a firmly adhering varnish layer, which comprises applying a coating of a varnish to at least part of the surface of a molded body of vulcanizable rubber having olefinic double bonds, said varnish having at least one compound with a member which on subsequent vulcanization of the coated molded body will participate in the vulcanization reaction, and subsequently subjecting the coated molded body to vulcanization to cause said member to participate in the vulcanization reaction and effect binding of the varnish layer to the molded body and produce a vulcanized rubber molded body with a firmly adhering varnish layer.

Other features which are considered as characteristic for the invention are set forth in the appended claims.

Although the invention is illustrated and described herein as embodied in molded bodies of vulcanized rubber having a vulcanized-on layer of varnish, it is nevertheless not intended to be limited to the details shown, since various modifications may be made therein without departing from the spirit of the invention and within the scope and range of equivalents of the claims.

DETAILED DESCRIPTION OF THE INVENTION

The present invention is a method for the manufacture of a molded part of vulcanized rubber provided with a firmly adhering layer of varnish, characterized by the feature that a varnish which contains a binder comprising groups participating in the vulcanizing reaction is applied to at least part of the surface of the molded body of rubber which contains the usual auxiliary agents and additives and has olefinic double bonds, and the so coated molded part is subjected to a vulcanizing reaction.

Molded rubber parts provided with a vulcanized-on layer of varnish are also a subject of the present invention.

In the method according to the invention, vulcanizable molded rubber parts are provided, prior to being vulcanized, with a varnish capable of being vulcanized-on, and are subsequently subjected to a known vulcanizing reaction. The molded body can, of course, be varnished on the entire surface or on only part of the surface of the molded body.

Suitable for the method according to the invention are any vulcanizable, olefinically unsaturated types of rubber such as natural rubber (cis-1, 4-polyisoprene or trans-1, 4-polyisoprene) or synthetic rubber such as polybutadiene, styrene-butadiene, polychloroprene, polypentenamer or EPDM (ethylene, propylene, diene monomer) rubber or any mixtures of these rubber types mentioned as examples. In general, the rubber types to be varnished have a content of olefinic $=C=C=$ double bonds of 1 to 45, preferably 10 to 40 percent by weight, assuming a molecular weight of 24 for this grouping.

The vulcanization process can be accomplished in accordance with any known physical or chemical methods. For instance, molded parts can be vulcanized physically by electron irradiation or other high-energy irradiation or chemically, by using sulfur or sulfur chlorides as well as the known vulcanization accelerators such as mercapto-benzo-thiazole, mercapto-benzo-thiazole derivatives, or thiuram disulfide, or, using peroxides such as benzoyl peroxide as a radical former.

It is essential for the invention that the unvulcanized molded part is coated with a varnish which contains at least one compound as a binder or a binder component which is capable of participating in the vulcanizing reaction.

Particularly well suited are one- or two-component polyurethane varnishes which contain an olefinically unsaturated compound which is capable of participating in the vulcanizing reaction as a binder or a binder component. The concentration of olefinically unsaturated $=C=C=$ groupings in the binder of the varnish used should be 0.1 to 8 and preferably 0.5 to 6 percent by weight, referred to the binder, assuming a molecular weight of 24 for the olefinically unsaturated grouping.

Suitable two-component polyurethane varnishes are any known solvent-containing or solvent-less polyurethane varnishes, which contain organic polyisocyanates as well as organic polyhydroxyl compounds as binders, where the amount of these binder components corresponds preferably to an NCO/OH equivalence ratio of 0.5:1, and in particular 0.9:1 to 1.1:1, and wherein at least one of the components named, i.e. organic polyisocyanate and organic polyhydroxyl compound, is olefinically unsaturated and capable of participating in the vulcanizing reaction.

Suitable polyisocyanates are, for instance, compounds with the formula $Q(NCO)_n$, where $n=2$ to 4 and preferably 2, and Q signifies an aliphatic hydrocarbon radical with 2 to 18 and preferably 6 to 10 C-atoms; a cycloaliphatic hydrocarbon radical with 4 to 15, and preferably 5 to 10 C-atoms; an aromatic hydrocarbon radical with 6 to 15, and preferably 6 to 13 C-atoms; or an araliphatic hydrocarbon radical with 8 to 15 and preferably 8 to 13 C-atoms, for instance:

ethylene diisocyanate, 1,4-tetramethylene diisocyanate, 1,6-hyexamethylene diisocyanate, 1,12-dodecanediisocyanate, cyclobutane-1,3-diisocyanate, cyclohexane-1,3- and -1,4-diisocyanate as well as any mixtures of these isomers; 1-isocynato-3,3,5-trimethyl-5-isocynatomethylcyclohexane (German Published Prosecuted Application No. 1 202 785, U.S. Pat. No. 3,401,190), 2,4- and 2,6-hexahydrotoluylene diisocyanate as well as any mixtures of these isomers; hexahydro- 1,3- and/or -1,4-phenylene diisocyanate, perhydro-2,4'- and/or -4,4'-diphenylmethane diisocyanate, 1,3- and 1,4-phenylene diisocyanate, 3,4- and 2,6- toluylene diisocyanate as well as any mixtures of these isomers; diphenylmethane- 2,4'- and/or -4,4'-diisocyanate, naphthylene-1,5-diisocyanate.

Preferred are the known "varnish polyisocyanates", for instance, biuretpolyisocyanates of the hexamethylene diisocyanate type; polyisocyanates of the 2,4-diisocyanato toluol type containing isocyanurate groups; polyisocyanates containing 1-isocyanato-3,3,5-trimethyl 1-5-isocyanato-methyl cyclohexane (IPDI) or hexamethylene diisocyanate or urethane groups such as the reaction product of 3 mol 2,4-diisocyanatotoluol with one mol trimethylol propane or of 3 mol IPDI with 1 mol trmethylol propane.

The polyhydroxyl component known for use in polyurethane chemistry involves higher-molecular polyols with a molecular weight range of 300 to 10,000 and preferably 800 to 4,000. Optionally the higher molecular weight polyols may be used in combination with up to 50 hydroxyl equivalent percent of low-molecular polyols with a molecular weight range of 62 to 300.

Suitable higher-molecular polyhydroxyl compounds are, in particular, the known polyester polyols as for example the reaction products of polyvalent alcohols such as ethylene glycol, propylene glycol -,2 or -1,3, tetramethylene glycol, hexamethylene glycol, 2-methyl-propane-diol-(1,3), diethylene glycol, triethylene glycol, dipropylene glycol, trimethylol propane, or glycerin with preferably bivalent carboxylic acids or their anhydrides such as succinic acid, adipic acid, suberic acid, azelaic acid, phthalic acid, isophthalic acid, tetrahydrophthalic acid, hexhydrophthalic acid, maleic acid, fumaric acid, or terephthalic acid.

Suitable higher-molecular polyhydroxy compounds are also in particular the known dihydroxypolycarbonates, such as are obtained in known manner from the named low-molecular glycols and diphenyl carbonate or phosgene.

Suitable higher-molecular polyhydroxyl compounds are also the polyhydroxylpolyethers such as are obtained by the known procedure of alkoxylation especially with ethylene oxide and/or propylene oxide using suitable starter molecules such as water or the mentioned low-molecular polyols. Suitable higher-molecular polyols are polyacetals, polyesteramides or polyacrylates having hydroxyl groups.

Suitable low-molecular polyols are, for example, the low-molecular alcohols mentioned in connection with the preparation of the polyesters, as well as unsaturated polyvalent alcohols with a molecular weight range of 88 to 300 such as 2-butene-1,4-diol, 3-hexene-1,6-diol, 8-hexadecene-1,16-diol, trimethylol-propane monoallyl ether, 2-butene-1,2-diol, 2-methylene-1,3-propanediol, maleic acid-bis-glycol ester, which is obtained by an ester interchange reaction from maleic acid-bis-methyl ester and ethylene glycol or the alkoxylation products thereof, or their alkoxylation products.

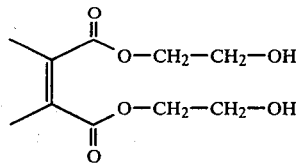

The condition important for the invention, namely, that the varnish binder must have at least one component participating in the vulcanizing reaction, is taken into consideration, in the case of two-component polyurethane varnishes, by the requirement that the polyisocyanate component or preferably the polyhydroxyl component has at least one olefinically unsaturated grouping capable of a vulcanizing reaction. This can be accomplished, for instance, by using simultaneously present olefinically unsaturated polyisocyanates, olefinically unsaturated higher-molecular polyhydroxyl compounds and/or olefinically unsaturated low-molecular polyols.

Suitable unsaturated polyisocyanates are, for instance, the reaction product of tris-(isocyanato hexyl)-biuret with unsaturated hydroxyl compounds such as methacrylic acid-β-hydroxy propylester or the reaction products of the varnish polyisocyanates, mentioned above by way of example, with unsaturated alcohols such as butene-2-diol-1,4 or allyl alcohol, where preferably the reaction partners are used in such quantities that in the statistical average, unsaturated polyisocyanates with an isocyanate functionality of at least 2 result as reaction products.

Suitable unsaturated higher-molecular polyhydroxyl compounds are, for instance, polyester polyols which have been obtained by using simultaneously present olefinically unsaturated dicarboxylic acids such as tetrahydrophthalic acid, maleic acid and/or fumaric acid, and/or, olefinically unsaturated low-molecular polyols of the type mentioned above; unsaturated polyether polyols such as are obtained, using the above-mentioned unsaturated low-molecular alcohols as starter in the alkoxylation reaction or unsaturated dihydroxy polycarbonates such as can be obtained, using the mentioned simultaneously present low-molecular unsaturated polyhydroxyl compounds in the preparation of the polycarbonates.

Suitable low-molecular unsaturated compounds are the compounds mentioned as examples, where 2-butene-1,4-diol is preferably used.

Single-component polyurethane varnishes suitable for the method in accordance with the invention are single-component varnishes of the NCO-prepolymer type, which dry under the influence of air humidity, as well as physically drying, solvent-containing polyurethane varnishes.

The single component varnishes which dry under the influence of air moisture for use as binder are those which contain prepolymers having isocyanate groups. These prepolymers are obtained, for instance, by reaction of the polyisocyanates mentioned as examples with an equivalent ratio above 1.5:1 and preferably between 2:1 and 4:1. The discussions in connection with the two-component polyurethane varnishes apply here regarding the condition important for the invention that olefinic double bonds be present.

The physically drying polyurethane varnishes are solvent-containing varnishes which contain as binder film-forming, substantially linear high-molecular polyurethanes. These polyurethanes are obtained in known manner, preferably from organic diisocyanates of the kind mentioned above as examples, difunctional higher and/or low-molecular hydroxyl compounds of the kind mentioned and optionally, diamine chain extenders with a molecular weight range of 60 to 300. In the preparation of the linear polyurethanes, monofunctional compounds can be used as chain interrupters, i.e. monoisocyanates such as hexylisocyanate, cyclohexyl isocyanate or phenyl isocyanate, or monovalent alcohols such as methanol, ethanol, butanol, tertiary butanol, octanol, isopropanol or cyclohexanol, or monoamines such as methylamine, butylamine, dibutylamine or stearylamine. Also olefinically unsaturated methacrylic-acid hydroxy alkyl esters or allyl alcohol which are monofunctional versus isocyanate groups, can be used simultaneously. The use of simultaneously present build-up components of the kind mentioned above as examples higher than difunctional is not precluded in principle, especially if at the same time the mentioned monofunctional build-up components are used.

In the preparation of the binders for the physically drying varnishes, the olefinic double bonds which are important for the invention are incorporated by the simultaneous use of the olefinically unsaturated structure components mentioned as examples. The incorporation of the olefinic double bonds is preferably accomplished here by the simultaneous use of low-molecular, olefinically unsaturated glycols in the molecular weight range 88 to 300 of the kind mentioned as examples.

The linear polyurethanes are preferably prepared in two stages according to the prepolymer principle, where first, NCO prepolymer is prepared at 80° to 150° C. for a polyhydroxyl component and a diisocyanate component in an NCO/OH equivalent ratio of 1.1:1 to 4:1 and preferably 1.2:1 to 3:1. The polyhydroxyl component is composed prefereably of (a) higher-molecular diol of the kind mentioned as an example, (b) unsaturated low-molecular diol of the type mentioned as an example, and (b) low-molecular diol of the molecular weight range 62 to 300. The mass ratios of the individual components are chosen so that per hydroxyl group of the component (a) there are 0.01 to 12 hydroxyl groups of component (b) and 0 to 10 hydroxyl groups of component (c).

After the prepolymer formation, the completion of which can be determined by NCO titration, a chain extension reaction takes place, preferably by a diamine chain extension agent, either in the melt or in solution. Suitable diamine chain extenders are preferably primary aliphatic, cycloaliphatic or mixed aliphatic-cycloaliphatic diamines containing primary amino groups of the molecular weight range 60 to 300. Examples are ethylene diamine, tetramethylene diamine, hexamethylene diamine, 4,4-diaminodicyclohexyl methane, 1,4-diaminocyclohexane, 4,4'-diamino-3,3'-dimethyl-dicyclohexylmethane or 1-amino-3,3,5-trimethyl-5-aminomethylcyclohexane (isophoron diamine). Especially preferred are 4,4'-diaminodicyclohexylmethane or the last-mentioned isophoron diamine.

Suitable solvents are, for instance, methylene chloride, mixtures of toluol with methanol or isopropanol, acetic-acid ethyl esters, acetic-acid butyl esters or any other inert varnish solvent. The chain extension reaction can also be carried out particularly advantageously in heated reaction worm machines. The chain extension reaction is carried out generally in the temperature range of 10 to 250, preferably 80° to 220° C. The diamine chain extender is generally employed in an amount which corresponds to an $NCO/NH_2$ equivalent ratio of 0.8:1 to 1.2:1 and preferably 1:1.

The monofunctional structural components which optionally can be used at the same time, can be used, in the case of isocyanates and alcohols, in the preparation of the NCO prepolymers, and in the case of amines, in the chain extension reaction. A conceivable variant of controlling the molecular weight through simultaneous use of monofunctional structure components consists, for instance, of bringing into reaction NCO prepolymers prepared from difunctional structure components with a slightly deficient quantity of diamine chain extenders in the presence of monovalent alcohols such as isopropanol. The isocyanate groups then react first with the more reactive diamine until the latter has disappeared completely, which is followed by a chain-interrupting reaction of the then remaining isocyanate groups with the isopropanol which is used as the solvent.

Otherwise, the type and mass ratios of the structure components are preferably chosen so that numerically an average molecular weight of the linear of the polyurethanes or polyurethane polyureas of 10,000 to infinity (theoretically for exactly equivalent mass ratios of exclusively difunctional structure components) is obtained, the preferred average molecular weight is between 15,000 and 200,000. A chain break-off required for adjusting such a molecular weight can be achieved by the simultaneous use of a small excess of difunctional structure components capable of reacting with isocyanate groups, particularly chain extenders, as well as of the simultaneous use of small amounts of monofunctional reaction partners of the type mentioned as examples.

In carrying out the method according to the invention the varnishes mentioned as examples are used without solvent (this applies particularly to the two-component systems or humidity-drying single-component varnishes provided the application media have a viscosity low enough for working them) or in a form dissolved in solvents of the type mentioned as examples. It is, of course, possible to use simultaneously the customary aids and additives such as pigments, reaction inhibitors, catalysts, flame inhibiting substances, softeners, dyes or fillers as well as fungistatically or bacteriostatically effective substances.

The molded rubber bodies can be coated by any known method of varnish technology. The coating media are preferably poured onto the molded body to be coated, and the solvent which may have been used simultaneously is evaporated. In this manner the required layer thickness can be obtained by pouring-on the coatings repeatedly. The method according to the invention makes possible in a simple manner the preparation of firmly adhering coatings with a thickness of the dry film of about 20 to 150 $\mu$m. The chemical or physical drying of the coatings can take place prior to the vulcanization or also simultaneously with the vulcanization.

Vulcanization aids that may be necessary are incorporated into the molded rubber body preferably prior to the molding and coating.

The vulcanization is carried out, as already explained, following the coating of the molded part and can be carried out in accordance with any desired physical or chemical method. The molded part of the vulcanizable olefinically unsaturated rubber type can, of course, contain, besides the vulcanizing aids already mentioned by way of example, any of the aids and additives customary in rubber technology such as carbon black, softener oils, light-protection media or thermal aging protection agents.

After the completion of the vulcanizing reaction, a molded rubber part with a firmly adhering vulcanized-on varnish layer is obtained. The molded parts so obtained are distinguished by excellent adhesion of the varnish layer. The varnish layers exhibit great flexibility at elevated as well as low temperatures. In principle, it is also possible to cover the varnish layer prior to the vulcanization with fibers, for instance, electrostatically, so that additional variations of the surface can be generated in a simple manner.

The following examples will illustrate the invention. All percentages given are in percent by weight.

EXAMPLE 1

(A) Preparation of a physically drying clear polyurethane polyurea varnish with a =C=C= content of 1.14% by weight, referred to solid matter.

300 g (0.15 mol) of a polyester (OH-number 56) made of adipic acid, butane diol and hexane diol are dehydrated for 30 minutes at 120° C., 15 Torr. Then, 22 g (0.24 mol) butene-(2)-diol-(1,4) and 18 g (0.2 mol) butane diol-1,4 and 166.5 g (0.75 mol) isophoron diisocyanate (IPDI) are added to the melt. The mixture is stirred for 50 minutes in a nitrogen atmosphere at 120° C. Subsequently, the NCO-number of the polymer is determined:

NCO found: 2.33%; NCO calculated: 2.49%.

500 g toluol are then added to the prepolymer. The charge is allowed to cool to room temperature and within 30 minutes, a solution of 20.4 g (0.12 mol) isophoron diamine (IPDA) in 606 g toluol and 474 g isopropanol is swiftly added dropwise. After everything is added, only very little NCO can be detected by IR spectroscopy. A 25-% solution with a viscosity of 299 mPas/25° C. is obtained. >C=C< content, referred to solid matter: 1.14% by weight.

(B) Method for Coating of Rubber according to the Invention. For coating, a rubber sheet with the dimensions 165×65×2 mm was chosen. The rubber sheet had the following composition:

Oil-diluted SBR (styrene-butadiene rubber) (approx. 15% =C=C=): 70.00 parts by weight
Solution SBR (approx. 28% =C=C=): 42.00
Polyisoprene (approx. 35% =C=C=): 11.20
Carbon black: 110.30
Stearic acid: 1.40
Light-protection wax of the paraffin type: 9.80
Softener of the naphthalene oil type: 11.20
Zinc oxide: 5.05
Mercapto benzimidazole: 1.95
Calcium oxide: 5.20
Mercapto benzo-thiozole disulfide: 1.40
Tetramethylthiuram disulfide: 1.40
Sulfur: 1.40

The solution obtained by Procedure (A) is applied with a brush to said rubber sheet (thickness of Wet film: 150 μm). After the solvent has evaporated, the coated molded body is vulcanized for 30 minutes at 150° C. In this manner, a high-gloss coated rubber sheet is obtained, and the flexible polyurethane coating of the rubber sheet cannot be removed from the rubber sheet with the finger nail (thickness of dry film: 80 μm).

(C) Reference Example

The solution obtained by Procedure (A) is applied to a vulcanized rubber sheet with a wiper or a brush. After the solvent has evaporated, a high-gloss coated rubber sheet is obtained, the flexible polyurethane coating of which can easily be removed from the rubber plate with the finger nail.

EXAMPLE 2

300 g (0.15 mol) of a polyester (OH-number 56) prepared from adipic acid, hexane diol and butane diol is dehydrated for 30 minutes at 120° C. and 15 Torr, 17.6 g (0.2 mol) butene-(2)-diol-(1,4), 6.7 g (0.05 mol) dimethylol propionic acid and 18 g (0.2 mol) butane diol and then, 166.5 g (0.75 mol) isophoron diisocyanate (IPDI) are added to the melt. The mixture is stirred for 2 hours in a nitrogen atmosphere at 120° C. Subsequently, the NCO number of the prepolymer is determined.

NCO found: 2.36%; NCO calculated: 2.48%.

500 g toluol are then added to the prepolymer. The charge is then allowed to cool to room temperature and a solution of 20.4 g (0.12 mol) isophoron diamine (IPDA) in 612 g toluol and 477 g isopropanol is swiftly added dropwise within 30 minutes. After everything has been added, only very little NCO can still be detected by IR spectroscopy. The dissolved binder contained 0.91% by weight =C=C=, referred to solid matter.

The polyurethane solution obtained in this manner is applied in accordance with Example 1(B) to an unvulcanized rubber sheet of the type mentioned in Example 1(B). After the solvent has evaporated, the coated rubber is vulcanized. The example shows that additionally incorporated polar groups (in this case, -COOH) do not impair the adhesion of the rubber.

EXAMPLE 3

This example shows that a polyurethane polyurea which contains no olefinically unsaturated group in the polymer molecule exhibits poor adhesion after a rubber sheet is coated and vulcanized. The polyurethane film can easily be lifted and pulled off the rubber sheet with the finger nail.

300 g of the polyester described in Example 1(A) are dehydrated for 30 minutes at 120° C. and 12 Torr. Then, 26 g (0.4 mol) butane diol, 6.7 g (0.05 mol) dimethylolpropionic acid and 166.5 g (0.75 mol) IPDI are added to the melt. The mixture is stirred for 60 minutes at 110° C. in a nitrogen atmosphere. Subsequently, the NCO-number of the prepolymer is determined.

NCO found: 2.50%; NCO calculated: 2.47%.

500 g toluol are then added to the prepolymer in batches. The mixture is cooled down to room temperature. Subsequently, a solution of 20.4 g (0.12 mol) IPDA in 612 g toluol and 477 g isopropanol is swiftly added dropwise within 30 minutes. When everything has been added, very little NCO can still be detected by IR spectroscopy.

The 25-% solution is applied with a brush to an unvulcanized rubber sheet of the type mentioned in Example 1(B). After the solvent has evaporated, the coated rubber is vulcanized for 30 minutes at 150° C. The high-gloss flexible polyurethane coating (thickness of dry film: 80 μm) can be lifted off the rubber sheet with the finger nail and can then easily be removed from the rubber.

EXAMPLE 4

(A) Preparation of a Varnish Polyisocyanate Containing Olefinic Double Bond.

200 g (1.04 NCO equivalents) of a biuret polyisocyanate consisting essentially of tris-(isocyanato hexyl) biuret of the hexamethylene diisocyanate type are mixed with 0.2 g tin octoate and are heated in a nitrogen atmosphere to 80° C. While stirring, 50 g (0.35 OH equivalents) methacrylic acid-β-hydroxy polyester are then added dropwise within 10 minutes. The heat source is removed during this operation. Due to the exothermic reaction, the charge remains at a temperature of 80° to 83° C. during the reaction. After everything has been added, the charge is cooled down and the NCO content of the modified isocyanate is determined:

NCO found: 10.5%; NCO calculated: 11.6%.

Subsequently, 0.25 g hydroquinone is added to the charge for stabilization.

(B) Preparation of a Clear Two-Component Varnish 20.8 g of the modified polyisocyanate (0.052 NCO equivalents) described under (A) are mixed with 46.2 g toluol and 10 g (0.052 OH equivalents) of a polyester of adipic acid, phthalic acid anhydride, maleic acid anhydride, propylene glycol-1,2 and trimethylol propane with the OH-number 290 (8.8% OH). The varnish solution so obtained has a viscosity of 30 mPas/25° C. The =C=C= content of the dissolved two-component binder is about 2.27%.

(C) Method According to the Invention

To carry out the method according to the invention, a rubber sheet with the dimensions 170×70×2 mm was coated with the above-mentioned varnish solution by means of a brush. The rubber used here corresponded to the following composition:

Polychloroprene (about 27% =C=C=): 41.00 parts by weight
EPDM (about 1.6% =C=C=): 59.00
Carbon black: 83.00
Mineral softener oil: 32.00
Magnesium oxide: 1.60
Zinc oxide: 3.41
Calcium oxide: 3.41
Benzoyl peroxide: 4.25

After the solvent has evaporated, the varnished sheet is heated for 30 minutes to 150° C. A high-gloss, flexible coated sheet of vulcanized rubber is obtained, the coating of which cannot be removed with the finger nail (thickness of dry film: 80 μm).

We claim:

1. Method of manufacturing an article of vulcanized rubber having a strongly attached urethane varnish layer, which comprises employing as the substrate to be coated, a body with at least part of its surface composed of unvulcanized rubber containing olefinic double bonds, applying to the rubber surface of the body before vulcanization of said rubber, a urethane varnish which contains a binding agent with olefinic, unsaturated groups which on subsequent vulcanization of the coated body will take part in the vulcanization reaction; and subsequently subjecting the coated body to vulcanization with the binding agent entering the vulcanization reaction causing the urethane varnish to be strongly connected with the surface of the rubber containing the olefinic double bonds.

2. Method according to claim 1, wherein said varnish is polyurethane varnish having a compound containing as a member an olefinically unsaturated group which will participate in the vulcanizing reaction.

3. Method according to claim 2, wherein the varnish is an isocyanate terminated polyester.

4. Method according to claim 2, wherein the varnish is a 2-component polyurethane varnish.

5. An article of vulcanized rubber having a strongly attached urethane varnish layer produced by the process of claim 1.

* * * * *